(12) United States Patent
Lievestro et al.

(10) Patent No.: US 7,192,260 B2
(45) Date of Patent: Mar. 20, 2007

(54) PROGRESSIVE CAVITY PUMP/MOTOR STATOR, AND APPARATUS AND METHOD TO MANUFACTURE SAME BY ELECTROCHEMICAL MACHINING

(75) Inventors: Terry Lievestro, West Chester, OH (US); John Reynolds, Mainville, OH (US); Tom Chamberlain, West Chester, OH (US)

(73) Assignee: Lehr Precision, Inc., Cincinnati, OH (US)

( * ) Notice: Subject to any disclaimer, the term of this patent is extended or adjusted under 35 U.S.C. 154(b) by 308 days.

(21) Appl. No.: 10/887,189

(22) Filed: Jul. 8, 2004

(65) Prior Publication Data

US 2005/0079083 A1 Apr. 14, 2005

Related U.S. Application Data

(60) Provisional application No. 60/510,107, filed on Oct. 9, 2003.

(51) Int. Cl.
*F03C 2/08* (2006.01)

(52) U.S. Cl. .................. 418/48; 418/153; 418/178; 29/888.023; 29/888.061; 205/651

(58) Field of Classification Search .................. 418/48, 418/153, 178; 29/888.023, 888.061; 205/651, 205/668
See application file for complete search history.

(56) References Cited

U.S. PATENT DOCUMENTS

| | | | |
|---|---|---|---|
| 3,084,631 A | 4/1963 | Bourke | |
| 3,499,830 A | 3/1970 | Haggerty et al. | |
| 3,547,798 A | 12/1970 | Haggerty et al. | |
| 3,553,095 A | 1/1971 | Daniel et al. | |
| 3,616,343 A | 10/1971 | Inoue | |
| 3,769,194 A | 10/1973 | Haggerty et al. | |
| 3,896,012 A | 7/1975 | Buschbaum et al. | |
| 4,104,009 A | 8/1978 | Chanton | |
| 4,250,371 A | 2/1981 | Haug et al. | |
| 4,376,020 A | 3/1983 | Andrews | |
| 4,475,996 A | 10/1984 | Inoue | |
| 4,486,279 A | 12/1984 | Fromson et al. | |
| 4,676,725 A | 6/1987 | Eppink | |

(Continued)

FOREIGN PATENT DOCUMENTS

EP 0 980 729 A1 2/2000

(Continued)

OTHER PUBLICATIONS

Electrochemical Machining (ECM), Tool and Manufacturing Engineers Handbook, Vol. 1 Machining, 4th Edition, Society of Manufacturing Engineers, Dearborn, p. 14/28.

*Primary Examiner*—Hoang Nguyen
(74) *Attorney, Agent, or Firm*—Baker & Hostetler LLP

(57) ABSTRACT

Electrochemical machining is used to generate the helical lobe profiles of the stator of a progressive cavity pump or motor. A thin, elastomeric liner, of uniform thickness is bonded either to the interior of the stator, or to the exterior of the rotor. Where the elastomeric liner is to be bonded to the interior of the stator, bonding is improved by electrically etching the interior of the stator during the electrochemical machining process to produce a roughened surface.

16 Claims, 5 Drawing Sheets

U.S. PATENT DOCUMENTS

| | | | |
|---|---|---|---|
| 4,690,737 A | 9/1987 | Vishnitsky | |
| 4,846,642 A * | 7/1989 | Nuber et al. | 418/152 |
| 4,851,090 A | 7/1989 | Burns et al. | |
| 4,997,534 A | 3/1991 | Thornton | |
| 5,002,643 A | 3/1991 | Andrews | |
| 5,004,529 A | 4/1991 | Vishnitsky | |
| 5,016,460 A | 5/1991 | England et al. | |
| 5,064,521 A | 11/1991 | Stepanenko et al. | |
| 5,171,138 A | 12/1992 | Forrest | |
| 5,314,598 A | 5/1994 | Glew et al. | |
| 5,320,505 A * | 6/1994 | Misiak et al. | 418/55.1 |
| 5,759,019 A | 6/1998 | Wood | |
| 5,846,665 A * | 12/1998 | Timmer et al. | 428/626 |
| 6,099,715 A | 8/2000 | Frembgen | |
| 6,183,226 B1 | 2/2001 | Wood | |
| 6,214,200 B1 | 4/2001 | Altena et al. | |
| 6,231,748 B1 | 5/2001 | Agafonov et al. | |
| 6,250,340 B1 | 6/2001 | Jones et al. | |
| 6,309,195 B1 | 10/2001 | Bottos et al. | |
| 6,336,796 B1 | 1/2002 | Cholet et al. | |
| 6,413,407 B1 | 7/2002 | Bruns et al. | |
| 6,464,855 B1 | 10/2002 | Chadda et al. | |
| 6,543,132 B1 | 4/2003 | Krueger et al. | |
| 2003/0089621 A1 | 5/2003 | Anderson et al. | |

FOREIGN PATENT DOCUMENTS

| | | |
|---|---|---|
| FR | 1592149 | 5/1970 |
| GB | 1281117 | 7/1972 |

* cited by examiner

PROGRESSIVE CAVITY PUMP/MOTOR STATOR, AND APPARATUS AND METHOD TO MANUFACTURE SAME BY ELECTROCHEMICAL MACHINING

CROSS REFERENCE TO RELATED APPLICATION

This application claims priority from U.S. provisional application 60/510,107, filed Oct. 9, 2003.

FIELD OF THE INVENTION

This invention relates to the manufacture of progressive cavity fluid mechanisms, that is, progressive cavity pumps and progressive cavity motors, and more particularly to a novel stator structure, and to an apparatus and process for producing the stators of such pumps and motors. The stators of progressive cavity mechanisms are typically very long, some being up to seven meters in length.

BACKGROUND OF THE INVENTION

U.S. Pat. Nos. 1,892,217 and 2,028,407, to R. J. L. Moineau, disclose a gear mechanism for use as a progressive cavity pump or motor. In a typical application of progressive cavity technology, the drilling of subterranean wells, a progressive cavity motor is used as a downhole motor to convert the energy of a flowing drilling fluid to mechanical power to rotate a drill bit.

In a progressive cavity pump or motor an interference fit between the external profile of the rotor and the internal profile of the stator provides a seal isolating the cavities of the pump or motor from adjoining cavities. The seal resists the fluid pressure which results from the mechanical pumping action, or from the conversion of fluid motion to mechanical energy in a motor. Because of the requirement for an interference fit between the rotor and stator, one or both of these components must be covered with a resilient, or dimensionally forgiving, material which also allows the pump or motor to pass or transfer abrasive particles and other objects carried along with the fluid. Historically, the resilient material has been provided on the interior of the stator.

The resilient material used for the stator introduces weaknesses into the operation of the pump or motor and shortens its operating life. Common elastomers have a temperature tolerances below that of most of the other components in the pump or motor, which are made of metal.

Mechanical resistance of the elastomer is also a concern because of the high fluid pressures generated in the cavities of the pump and motor. These high pressures, and the resulting reactive forces, result in a significant deflection and stress in the elastomer, particularly at the locations of the interferences between the rotor and stator. The friction resulting from the large forces existing between the rotor and stator generates a large amount of heat, which is deleterious to the desired characteristics of the elastomer, and thus deleterious to the performance and life of the pump or motor.

The stator is conventionally constructed by molding an elastomer, having the desired helical interior profile, within a cylindrical steel tube or housing. Due to the helical profile of the stator's internal surface, the radial thickness of the molded elastomer, between its inner surface and the inner surface of the metal tube, varies. If the heating of the elastomer is excessive, its properties will degrade. Elastomers are generally highly insulative, and thus inherently restrict conduction of the heat generated at the interface of the rotor and stator to the thermally conductive metal tube, where the heat can be dissipated, usually with the aid of a cooling system such as a liquid cooling system or exposed fins. The radially thicker sections of the elastomer are more insulative, and thus degrade faster than the radially thinner sections. Additionally, the high pressures produced during the operation of the pump or motor can deflect the thicker sections of elastomer to the extent that the interference between the elastomer and the rotor is overcome, and contact with the rotor is lost. This loss of contact results in a reduced operating efficiency, characterized by decreased speed in the case of a motor, and by decreased flow in the case of pump. In addition, heat generated by the operation of the pump or motor, in some cases acting in conjunction with heat from the environment in which the pump or motor operates, can distort the shape of the molded elastomer on the interior of the metal tube. Elastomers have a high coefficient of thermal expansion compared to the other materials used in the construction of a progressive cavity pump or motor. As a result of the varying thicknesses and relatively high thermal expansion of the elastomer, the radially thick sections tend to exhibit greater distortion than the thinner sections. The distortion results in a geometric stator profile drastically different from the intended profile, and hinders the operation of the pump or motor. The distortion of the stator profile can generate additional heat, which in turn causes further distortion of the stator profile. Because of such distortion the stator contributes rapidly to its own degradation and ultimate failure.

As a result of the previously mentioned degradation, the interior of the thicker sections also can become brittle, allowing a stator lobe to break or "chunk out" of the stator profile. In addition, the pressure acting in the chambers formed by the stator and rotor may exceed the strength of the elastomer, causing the stator lobe to deflect from its original shape, and may also cause a break or "chunk out". These effects also degrade the efficiency of the pump or motor.

U.S. Pat. No. 6,309,195 describes a Moineau motor having a stator with a constant wall thickness. The stator is manufactured by a mechanical forming process in which the metal is bent locally to form a constant wall thickness in the outer steel structure, and in which the interior wall is covered by a thin wall elastomer. The dimensions of the stator produced by this forming method are limited, and more tolerance is required in the thickness of the thin wall elastomer. The patent alludes to the difficulty in maintaining the required twist tolerance. The outside of the casing is also contoured, making it more difficult to handle with the equipment commonly used to handle tubular articles in the drilling process. Machining of the outer wall of the casing to eliminate the contours would cause the wall thickness of the casing to be excessively small at some locations and comparatively thick at other locations.

Electrochemical machining has been used for various purposes. For example, U.S. Pat. No. 6,413,407 describes a process and apparatus for electrochemical machining (ECM) of flutes in the interior of a tube for use in a petroleum cracking furnace. However, so far as we are aware, ECM has not been used successfully in the production of the lobes in the interior of a stator of a progressive cavity device.

SUMMARY OF THE INVENTION

In accordance with this invention, ECM is used to generate the lobe profiles of the stator of a progressive cavity device. The invention overcomes many of the problems identified in the prior art for progressive cavity pumps and motors, including excessive heat build-up and the ability to hold tolerances. A motor having a stator made in accordance with the invention is particularly well suited for use as a downhole motor in a well to drive a drill bit.

In order to still have a compliant seal between the stator and rotor, a thin layer of constant thickness elastomer is still required. The desired inside profile of the stator, offset by the desired thickness of the elastomer layer, is formed in a circular, cylindrical inner wall of a tubular, metal workpiece serving as a stator blank. The surface finish of the inner profile must allow for bonding of the elastomer forming the profile that contacts the rotor. The constant thickness of the thin elastomer layer significantly reduces the adverse effects experienced in the case of an elastomer lining having a varying thickness. Because the elastomer layer can be relatively thin throughout, its insulating effect is also reduced, allowing for better heat transfer to the rigid metallic housing.

To achieve a surface finish suitable for bonding of the elastomer to the interior wall of the stator, a distinct ECM process is used, differing from the process described in U.S. Pat. No. 6,413,407, where a seal and a flush system were used to protect the finish of machined flutes formed by electrochemical machining of the interior of a tube for use in a petroleum cracking furnace. The machine used in the present invention is similar to that in U.S. Pat. No. 6,413,407, but the seal and flush system are eliminated, allowing controlled exposure of electrolyte to the finish-machined surface. This results in a rougher surface finish, which increases the effectiveness of the elastomer-to-metal bond. A device behind the cathode of the machine is used as a supporting guide only, instead of as a seal.

In the conventional ECM apparatus, the cathodic electrode is mounted by means of a threaded joint. The threaded joint is very cost effective, but is limited in its ability to transfer large amounts of electrical current from the drive tube to the cathode. The concentricity of the drive bar and electrode is also limited in its precision, and can vary. On the other hand, the concentricity requirement for progressive cavity pumps and motors requires more precision than is possible with a threaded joint.

This invention addresses the problems of electrical current transmission and concentricity by using a tapered adapter similar to those used for mounting rotating cutting tools in conventional machine tools. This taper can be precision machined to improve concentricity, and the increased surface contact area reduces resistance heating of the electrical joint.

The invention also provides a method of manufacturing progressive cavity stators by electrochemical machining and an alternative method by which electrolyte flows through the system.

The progressive cavity pumps and motors in accordance with the invention include a rotor rotatably disposed in a stator which has a suitably profiled interior surface but which can have an exterior shape in the form of a circular cylinder, or any other desired shape. Either the stator or the rotor is covered by a thin layer of elastomer or other flexible material for the purpose of providing a seal between the stator and rotor.

DETAILED DESCRIPTION OF THE PREFERRED EMBODIMENTS

Figure 1:
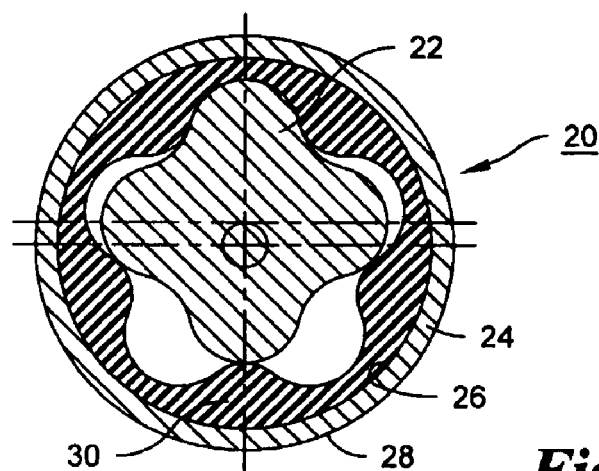
FIG. 1 is a radial section view of a conventional progressive cavity pump or motor in accordance with the prior art, having an elastomeric lining of variable thickness inside a rigid metallic housing.
Figure 2:
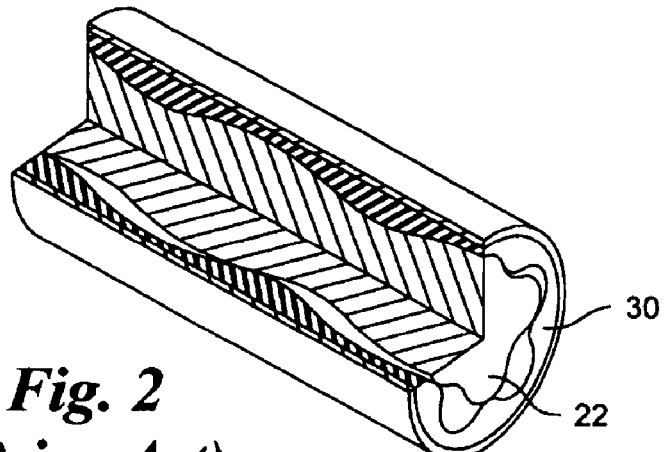
FIG. 2 is a cut-away isometric view of the progressive cavity pump or motor of FIG. 1.
Figure 3:
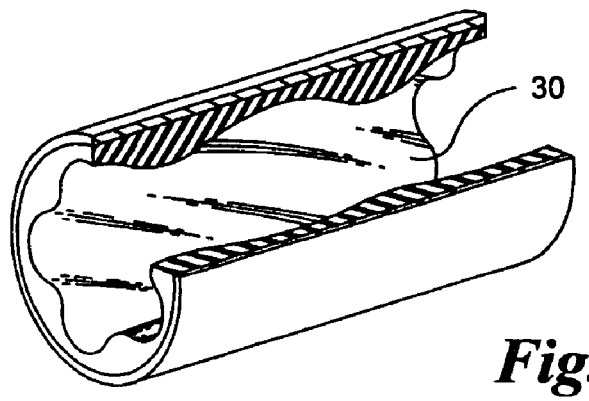
FIG. 3 is a cut-away isometric views of the stator of the progressive cavity pump or motor in FIG. 1, showing the helical configuration of the internal lobes of the stator.

As shown in FIGS. 1–3, the conventional Moineau motor 20 comprises a helically lobed rotor 22 disposed within a stator, the stator comprising a metal tube 24 having a circular, cylindrical interior wall 26 and a circular, cylindrical exterior wall 28, the interior wall having a molded elastomer liner 30 formed with helical lobes cooperable with the rotor to provide moving fluid chambers as the rotor rotates. As seen in all three of FIGS. 1–3, the thickness of the elastomer liner varies because of the presence of the lobes.

Figure 4:
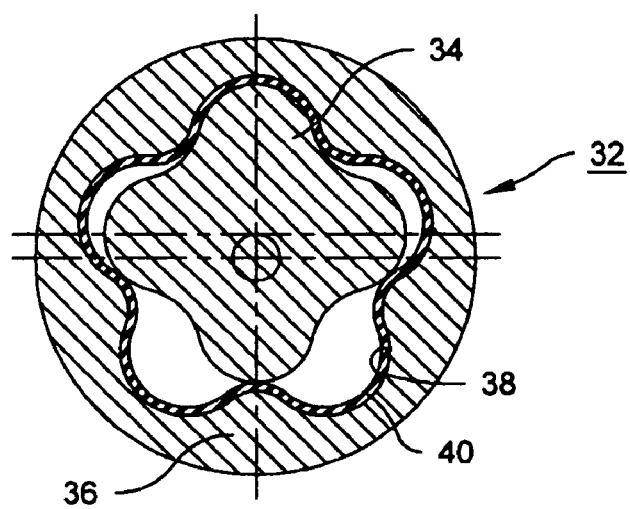
FIG. 4 is a radial section of a progressive cavity pump in accordance with the invention, showing the constant thickness of the elastomer lining of the stator.
Figure 5:
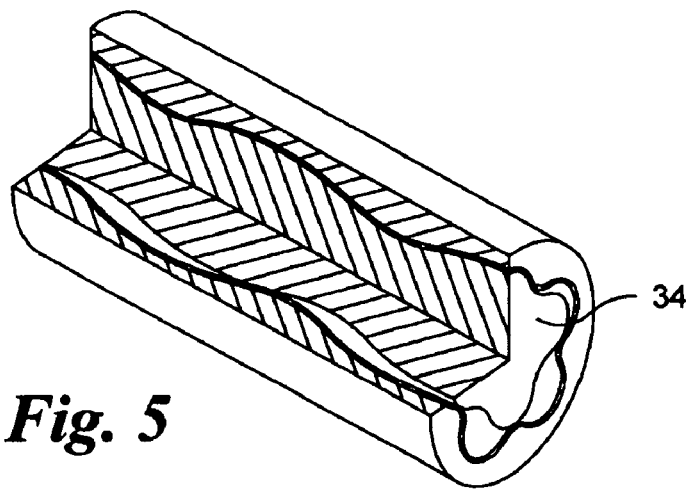
FIG. 5 is a cut-away isometric views of the progressive cavity pump or motor of FIG. 4.
Figure 6:
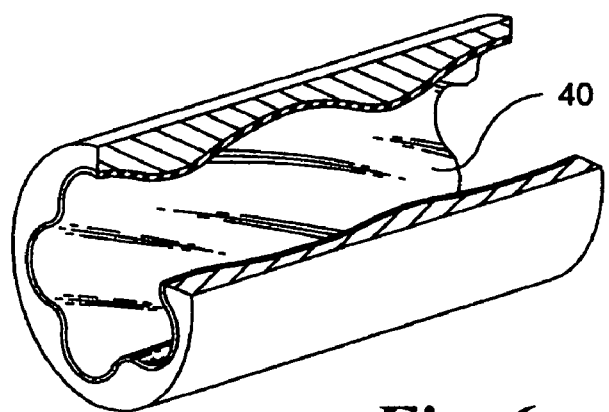
FIG. 6 is an isometric view of the stator of the progressive cavity pump or motor of FIG. 4.

A Moineau Motor 32 in accordance with the invention, illustrated in FIGS. 4–6, comprises a helically lobed rotor 34 disposed within a stator comprising a tube 36 and a flexible liner 40. The tube 36 is composed of steel or a similar structural material. The tube has an interior wall 38 having helical lobes formed by electrochemical machining, and a circular, cylindrical exterior. Using a suitable mold or core (not shown), the molded liner 40, of rubber or other suitable elastomer, is bonded to the interior wall of the stator after electrochemical machining. The elastomer liner, which has a uniform thickness, defines the interior wall of the stator. The helically lobed interior wall of the stator cooperates with the helically lobed rotor 34 to define a set of fluid chambers, which move axially as the rotor rotates within the stator.

In the operation of the motor 32, a pressure differential exists between each adjoining fluid chamber. In the operation of the motor, the hydraulic force acting on the rotor as a result of the pressure of a driving liquid causes the rotor to rotate about its longitudinal axis. Mechanical transfer of the rotation motion of the rotor to a drill bit can be accomplished through any of a variety of mechanisms known to those skilled in Moineau motor design. The sliding motion of the rotor at the rotor/stator interface generates frictional heat.

The lobed interior wall 38 of the stator mechanically support the elastomer liner 40, strengthening the elastomer liner, and allowing it to withstand operating loads and stresses greater than those which can be withstood by elastomer liners of conventional Moineau motors. The lobes on the interior of the metal stator tube also provide the metal tube with an increased surface area enhancing the transfer of heat generated at the rotor/stator interface. Thus, frictional heat generated at the rotor/stator interface is conducted through a relatively insulative, but thin, elastomer layer, over a relatively large area, to a stator tube having a high thermal conductivity, from which the heat is dissipated to the environment. The relatively low, and uniform, thickness of the elastomeric liner 40 allows for a nearly even transfer of heat around the circumference of the liner. The nearly even transfer of heat results in a highly uniform temperature distribution, which prevents thermal distortion of the elastomeric liner and resulting disturbance to the proper operation of the motor.

The advantages of the Moineau motor described above would, of course, be equally beneficial in a Moineau-style pump, which is essentially the inverse of the motor.

Because the elastomeric liner 40 is bonded to the rigid interior wall 38 of the stator, surface preparation of wall 38 is important. The elastomer will bond better to a rougher surface. U.S. Pat. No. 6,413,407 describes an electrochemical machining process in which every effort is made to yield the smoothest possible surface finish. To avoid degradation of the finish by further action of electrolyte after the bore is machined to the desired dimensions, an aft inner guide, fixed to the aft end of the electrode provides a seal behind the electrode, sealing the tool to the workpiece behind the electrode as it moves through the workpiece. Water or another suitable fluid is then introduced behind the aft guide to flush away stray electrolyte.

The process and apparatus used in the production of the stator are, in most respects similar to the process and apparatus described in U.S. Pat. No. 6,413,407, and thus the disclosure of that patent is incorporated by reference. In contrast with the process and apparatus described in U.S. Pat. No. 6,413,407, in accordance with this invention, in order to achieve a rougher surface finish of the interior wall of the rigid stator tube, the length of time during which the finish machined interior wall of the tube is exposed to electrolyte is increased and electrical current is allowed to continue to etch the finished interior surface, thereby achieving a roughening effect on the surface finish to improve bonding of the subsequently molded flexible layer.

Figure 7:
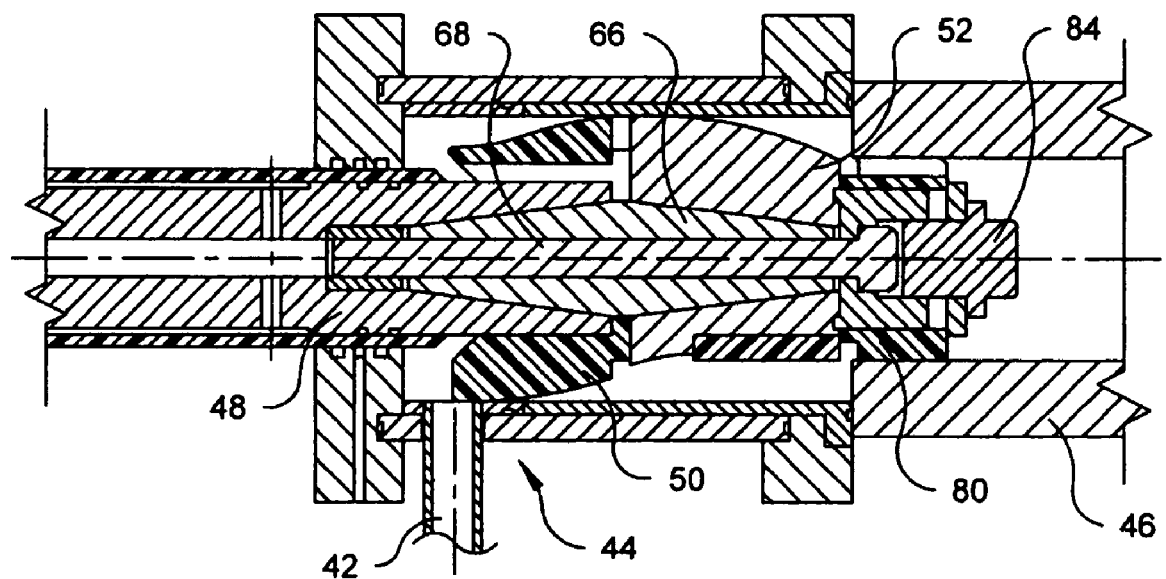
FIG. 7 is a longitudinal section of an entry manifold of the apparatus for electrochemical machining of a tubular workpiece to produce the stator illustrated in FIG. 6, showing the initial position of a fluted cathode entering the proximal end of the workpiece.
Figure 9:
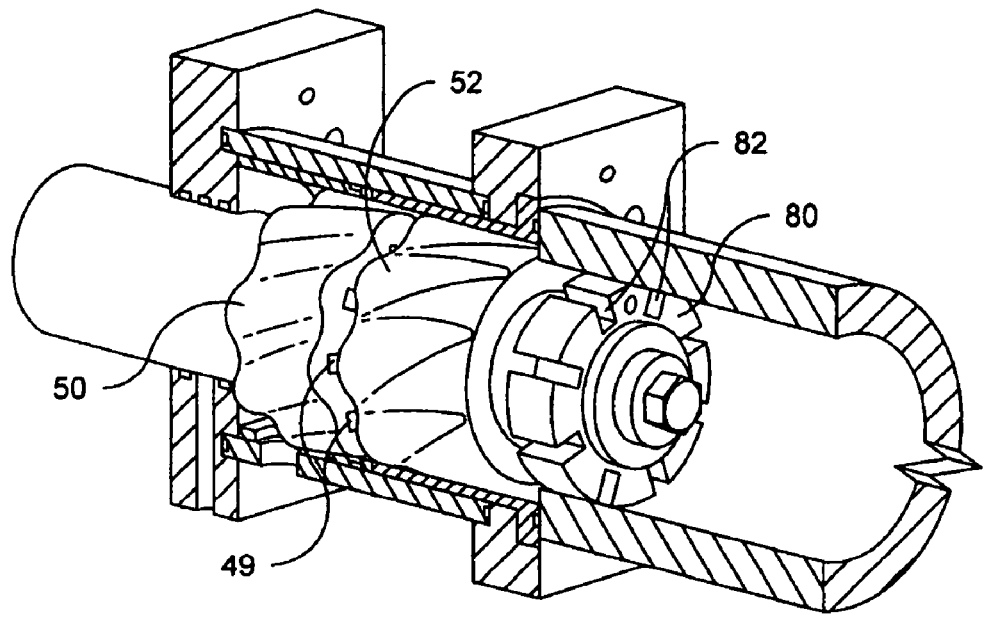
FIG. 9 is an isometric view of the cathode, entry manifold, and workpiece, as illustrated in FIG. 7.
Figure 10:
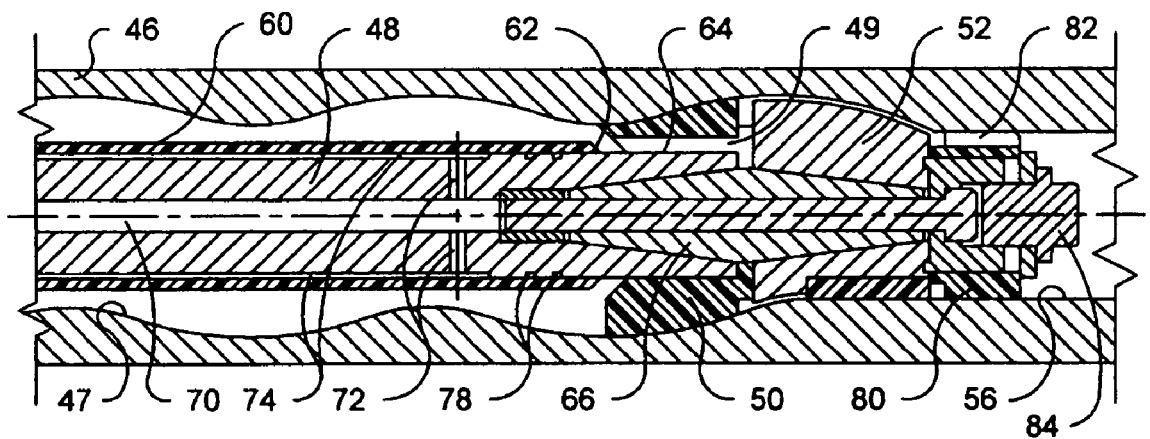
FIG. 10 is a longitudinal sectional view showing the cathode tool during electrochemical machining inside a workpiece.

As shown in FIG. 7, electrolyte is introduced through port 42 into a proximal inlet flow box 44. As depicted in FIG. 10, while electrochemical machining of the workpiece 46 progresses, the electrolyte passes over the length of the drive bar 48, between the drive bar and the finish machined portion 47 of the workpiece 46, and through slots 49 formed in the wall of a central opening of rear guide 50 which receives the drive bar. The slots 49 are preferably disposed parallel to one another, at intervals around the circumference of the central opening of the rear guide 50, as shown in FIG. 9. The flow of electrolyte through these slots allows for cooling of the cathode/drive bar interface. The electrolyte then passes over the cathode 52 in the proximal to distal direction, i.e., in the direction of cathode travel, past the front guide 80, and down the length of the unfinished bore 56 of the workpiece 46, into the distal exit flow box 58, where it is then discharged into an electrolyte return. The inlet flow box 44 must have an interior diameter, as shown in FIG. 7, equal to the major dimension of the finished profile of the workpiece, in order to support the weight of the cathode assembly before the rear guide enters the workpiece.

The negative output terminal of a DC power supply, preferably capable of delivering up to 30,000 Amperes at 25 volts, is connected to the workpiece, and the positive terminal is connected through a slip ring assembly to the drive bar.

Figure 8:
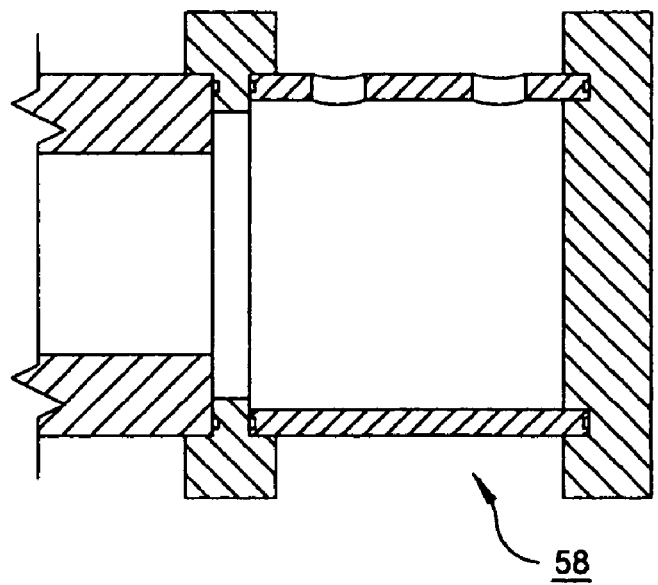
FIG. 8 is a longitudinal sectional of the exit manifold at the distal end of the workpiece.

The exit flow box, shown in FIG. 8, must have sufficient internal space to accept the cathode assembly as the cathode passes through the distal end of the workpiece. It must also be connected to the electrolyte flow system.

As shown in FIG. 10, the rear guide 50 directs electrolyte flow and supports the weight of the cathode assembly mounted on the drive bar 48, but does not serve a sealing function. Accordingly electrolyte remains in the space behind the cathode as machining progresses. An insulating sleeve 60 on the drive bar is cut back to location 62 to expose an annular area 64 of the drive bar of sufficient length to allow an electric current between the guide bar and the workpiece to exert an etching action on the finished interior wall of the workpiece.

The cross sectional area which needs to be to be removed in machining the stator of a progressive cavity pump or motor is large enough to require thousands of amperes of current. 30,000 amperes is sufficient for most such applications. However conducting electrical current at such a high level between the cathode and the drive bar is difficult in conventional ECM equipment. In the apparatus of the invention, as shown in FIGS. 7 and 10, a standard machine tool taper 66, similar to a CAT 50, is used both to locate the cathode and guide assembly on the drive bar, and to conduct current from the drive bar to the cathode. The taper has two frusto-conical exterior surfaces mating respectively a frusto-conical interior surfaces in the drive bar and the cathodic electrode, to provide precise alignment and also to provide a large contact area for carrying the very high electric current required in electrochemical machining. For the sake of maintenance, an internal connector or clamping device, 68 is used to mount the cathode 52 on the drive bar 48. The connector 68 may be constructed of a hard metal having very good electrical conductivity, such as UNS-C18200. Although a double taper, as shown, is preferred, a single taper, formed as an integral part of the drive bar, or as an integral part of the cathodic electrode could be used as an alternative.

A cooling liquid flows through the drive bar as in the conventional ECM apparatus. However, in this case, the cooling path can be isolated from the electrochemical machining process. Thus, as shown in FIG. 10, coolant flows along passages 74 formed by flats machined in the surface of the drive bar and the interior wall of the insulating cover 60, then inward through radial passages 72 in the drive bar, and then in the reverse direction through the central passage 70 in the drive bar. The coolant can also flow in the opposite direction. This allows for a better temperature control of the drive bar at locations remote from the cathode. Electrolyte flow under the rear guide 50, through slots 49, is then used to conduct heat away from the exposed part 64 of the drive bar 48 so that relatively little heat needs to pass through the insulating cover 60 on the drive bar, which acts as not only as an electrical insulator, but also as a thermal insulator.

At the proximal end of the drive bar, a double flow rotary coupling (not shown) is used to inject cooling water into the chambers between the insulating cover and the flats on the outside of the drive bar. At the distal end of the drive bar, the coolant is directed to the central passage 70 of the bar, and is then allowed to exit the center of the bar at the proximal end through the double flow rotary coupling. O-ring seals 78 under the insulating cover at the distal end, and similar O-ring seals at the proximal end, ensure that the cooling liquid is maintained in the cooling chambers without contamination from the electrolyte.

The front guide 80, shown in FIGS. 7, 9, and 10, has a circular exterior to guide the cathode through the tubular workpiece before the lobes are machined in it, and to support the weight of the cathode assemble as it transverses the workpiece during the machining cycle. The front guide has longitudinal slots 82 cut through it to allow electrolyte to pass from the cathode to the exit flow box, one such slot 82, being shown in FIG. 10. The front guide is mounted on the cathode clamping device 54, and a threaded plug 84 is used to retain the front guide.

Figure 11:
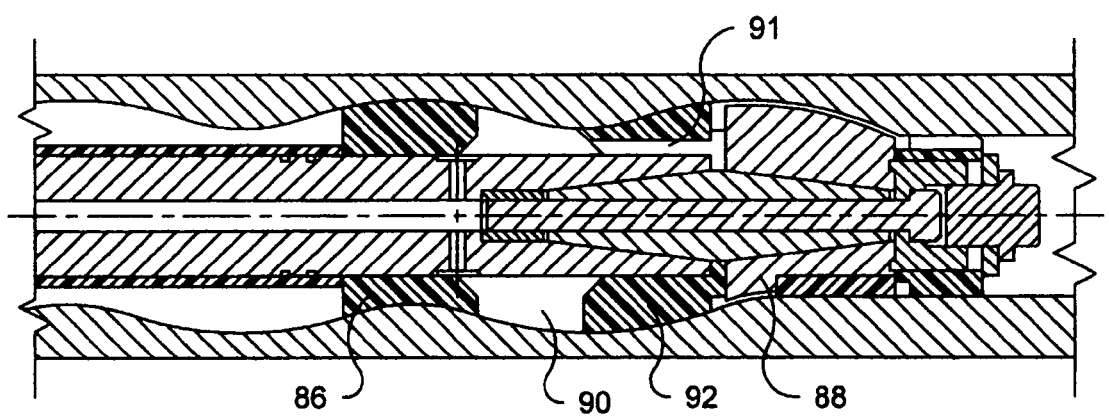
FIG. 11 is a longitudinal sectional view showing a cathode tool during electrochemical machining inside a workpiece, using the alternate embodiment of an etch chamber.

In an alternative embodiment of the invention, shown in FIG. 11, a second seal 86 is provided behind the cathodic tool 88 to form an etching chamber 90. In this alternative embodiment, the electrolyte is channeled through the center of the drive bar used to push the cathode through the workpiece. The electrolyte is also channeled into a 360 degree slot adjacent seal 86. The electrolyte is forced through slots 91 formed in the rear seal 92, and across the cathodic tool 88 as in the preferred embodiment. This alternative embodiment provides better control over the amount of time during which the machine-finished finish interior surface of the workpiece is exposed to post-machining etching. In a further alternative embodiment, not illustrated, the etching solution can be isolated from the electrolyte used in machining the lobes of the stator, in which case the composition of the etching solution can be different from that of the electrolyte. Optionally, a second cathodic tool may be positioned in the etch chamber to direct the etching to particular regions within the etch chamber.

Figure 12:
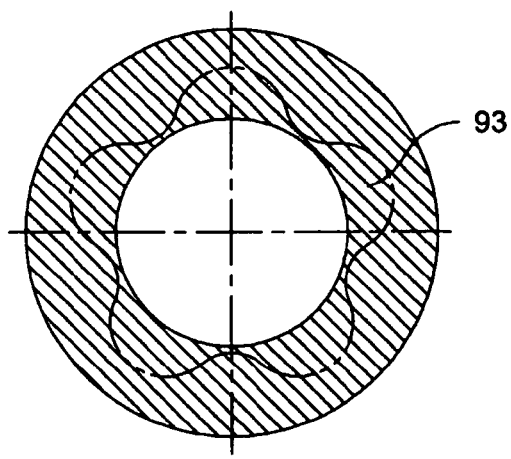
FIG. 12 is a schematic radial section a stator workpiece, showing the area to be machined by the electrochemical machining process.

In the electrochemical process of this invention, a salt-based electrolyte such as a water based sodium chloride (NaCl) or sodium nitrate ($NaNO_3$) solution may be used. This process breaks down water into $H_2$ and OH ions that will bond with the metal ions, usually Fe, to form FeOH that precipitates out of the solution and can be filtered. The amount of current required to remove the metal electrochemically is directly proportional to the volume of metal removed in a given time interval. Therefore, the area 93, shown in FIG. 12, and the feed rate of the cathode determine the volume of metal removed and the amount of power required for the process. The maximum feed rate found practical to date is one inch per minute, because of the limiting dissolution rate of the metal. Increase in feed is possible by increasing the length of the cathode to increase the surface area being dissolved.

The process is generally limited by resistance heating. It has been found that a 30,000 Ampere power supply is adequate for existing stator sizes. If larger stators are needed, larger power supplies and other conductors will be required.

A typical stator machining process in accordance with the invention uses a $NaNO_3$ electrolyte, at a concentration of 2.2 pounds per gallon of water, at a neutral PH, and at an inlet pressure of 330 psi, and an outlet pressures of 80 to 150 psi. The electrolyte is introduced at a temperature of 105° F.±1° F. The voltage used is approximately 20 volts, although it may be varied from 10V to 25V. The feed rates vary from stator to stator, but an average part is produced at a feed rate of approximately 0.55 inches per minute. The feed rates will normally vary from 0.15 inches per minute on larger parts to 1 inch per minute on smaller parts. Cathode taper angles vary from 50 to 150, but in most cases a 10° taper is preferred.

In summary, in accordance with the invention, a novel stator for a progressive cavity fluid mechanism is provided, in which the elastomer layer can be of uniform thickness, and very thin, so that it is less subject to damage resulting from thermal effects, and in which the exterior shape of the stator housing can be a simple circular cylinder, or any other desired shape. The stator is produced to precise dimensions by electrochemical machining, and, in the same process, the interior finish of the stator can be etched to promote secure bonding of the thin elastomer layer to the machined interior wall of the stator.

Figure 13:
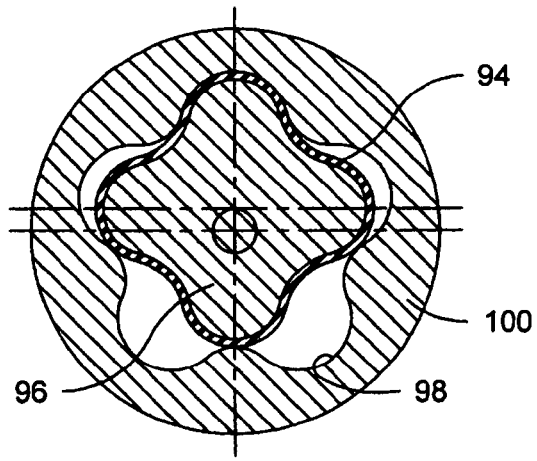
FIG. 13 is a radial section of an alternative progressive cavity pump in accordance with another embodiment of the invention.

In an alternative embodiment, as shown in FIG. 13, a thin elastomer layer 94 of uniform thickness can be formed on the rotor 96, in which case it is unnecessary, and undesirable, to etch the interior surface 98 of the stator 100. Even in this alternative embodiment, many of the advantages of electrochemical machining of the stator can be realized.

The invention claimed is:

1. A method for machining a tubular metal work-piece to produce a stator of a progressive cavity pump or motor, the method comprising:
   moving an electrode having a lobed external shape through the work-piece in a helical fashion while simultaneously providing an electrolyte between the electrode and the work-piece;
   establishing an electric current between the electrode and the work-piece via the electrolyte to controllably remove metal portions of the work-piece to modify the interior surface of the work-piece to a helically-lobed profile suitable for a stator of progressive cavity pump or motor;
   roughening the interior surface of the work-piece to improve bonding properties between a liner and the interior surface of the work-piece;
   maintaining the electrode within the work-piece for a sufficient duration to achieve said roughening the interior surface of the work-piece.

2. The method for machining a tubular metal work-piece of claim 1 wherein the step of roughening the interior surface of the work-piece is accomplished using electrolyte in a space behind the electrode.

3. A method for machining a tubular work-piece to produce the stator of a progressive cavity pump, comprising:
   moving a cathodic electrode, having a lobed external shape, through the tubular work-piece while simultaneously causing electrolyte to flow between the electrode and the work-piece and establishing an electric current, through the electrolyte, between the cathodic electrode and the work-piece;
   while moving the cathodic electrode through the tubular work-piece, electrochemically etching, and thereby roughening, the finished surface produced by the action of the cathodic electrode, by establishing an electric current between an electrical conductor and the finished surface of the work-piece through electrolyte in a space behind the cathodic electrode;

maintaining the electrode within the tubular work-piece for a sufficient duration of time to achieve the roughening of the finished surface of the work-piece.

4. An apparatus for use in machining a helically-lobed profile in the interior of tubular work-piece to produce a progressive cavity pump stator comprising:
an electrode having a lobed-shaped portion;
a drive bar arranged to move the electrode along a linear path while simultaneously rotating the electrode about an axis parallel to the linear path such that the electrode can electrochemically machine a helical lobed profile in the interior of the tubular work-piece to produce a stator suitable for a progressive cavity pump or motor;
a device for establishing a flow path for directing an electrolyte in a first space between the electrode and the work-piece such that an electrical power supply can establish an electric current through the electrolyte in the first space between the electrode and the work-piece,
wherein the flow path also includes a space defined behind the electrode as the electrode moves along the linear path such that electrolyte can be used to roughen the interior surface of the work-piece after the machining by the electrode and wherein the electrode is maintained within the work-piece for a sufficient duration of time to achieve said roughened interior surface.

5. The apparatus according to claim 4, in which the first space is further defined by a seal on the drive bar, the seal being positioned rearward with respect to the electrode and capable of forming a seal with the work-piece.

6. The apparatus according to claim 4, further including a rear guide on the drive bar configured to support the weight of the electrode as it moves through the work-piece.

7. The apparatus according to claim 6, wherein the rear guide is formed to allow electrolyte to pass between the rear guide and the drive bar in order to transfer heat away from the cathode.

8. An apparatus for use in machining the interior profile in the bore of a progressive cavity pump stator comprising:
a cathodic electrode shaped to machine helical lobes in a tubular work-piece;
a drive bar arranged to move the cathodic electrode along a linear path, while simultaneously rotating the cathode about an axis parallel to the linear path;
an electrical power supply connected to the cathodic electrode, and connectible to a tubular work-piece disposed along the linear path and arranged so that the cathodic electrode can pass axially along the interior of the tubular work-piece, whereby the power supply can establish an electric current through the cathodic electrode and the work-piece, as the cathodic electrode passes along the interior of the work-piece; and
a flow path for directing electrolyte past the cathodic electrode, between the cathodic electrode and the work-piece;
wherein the flow path includes a space defined between a portion of the drive bar and the work-piece, behind the cathodic electrode as the cathodic electrode moves along the linear path; and
including an electrical conductor, connected to the electrical power supply and exposed to the space, whereby an electric current is established, through electrolyte within the space, between the conductor and the work-piece;
the space being sufficiently long, in the direction of the linear path, that the electric current established in the space can etch, and thereby roughen the finished interior surface of the work-piece after machining thereof by the cathodic electrode,
wherein the cathodic electrode is maintained within the tubular work-piece for a sufficient duration of time to achieve the roughened finish of the interior surface of the work-piece.

9. An apparatus according to claim 8, in which the drive bar is connected to the cathodic electrode by a machine taper, the taper having a frusto-conical exterior surface mating with a frusto-conical interior surface in one of the drive bar and the cathodic electrode.

10. An apparatus according to claim 8, in which the space is further defined by a seal on the drive bar, spaced rearward from the cathodic electrode, and sealingly engageable with the work-piece.

11. An apparatus according to claim 8, in which a part of the drive bar is covered by an insulating sleeve, and in which the electrical conductor exposed to the space defined between a portion of the drive bar and the work-piece is a part of the drive bar not covered by the insulating sleeve.

12. An apparatus according to claim 8, including a rear guide on the drive bar, located behind the cathodic electrode as the electrode moves along the linear path, the rear guide engageable with, and slidable on, the finished interior of the work-piece, for supporting the weight of the cathodic electrode as it moves through the work-piece, the rear guide being forward of the space defined between a portion of the drive bar and the work-piece, and at least one passage allowing flow of electrolyte past the guide, from the space toward the cathodic electrode.

13. An apparatus according to claim 12, in which the at least one passage allowing flow of electrolyte past the guide is formed on the exterior of the rear guide, between the rear guide and the work-piece.

14. An apparatus according to claim 12, in which the rear guide is formed to provide space allowing electrolyte to pass between the rear guide and the drive bar in order to transfer heat away from the cathode to drive bar interface.

15. An apparatus according to claim 12, in which the rear guide is formed with a plurality of passages allowing electrolyte to pass between the rear guide and the drive bar in order to transfer heat away from the cathode to drive bar interface.

16. An apparatus according to claim 8, including a rear guide on the drive bar, located behind the cathodic electrode as the electrode moves along the linear path, the rear guide engageable with, and slidable on, the finished interior of the work-piece, for supporting the weight of the cathodic electrode as it moves through the work-piece, the rear guide being forward of the space defined between a portion of the drive bar and the work-piece, and a plurality of passages allowing flow of electrolyte past the guide, from the space toward the cathodic electrode.

* * * * *